(12) United States Patent
Ye et al.

(10) Patent No.: US 10,444,552 B2
(45) Date of Patent: Oct. 15, 2019

(54) PHOTOCHROMIC LENS MODULE, CAMERA AND TERMINAL DEVICE

(71) Applicant: Huawei Technologies Co., Ltd., Shenzhen (CN)

(72) Inventors: Haishui Ye, Shanghai (CN); Feng Yu, Yokohama (JP); Xiaojiong Wen, Shenzhen (CN); Jiahui Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/576,612

(22) PCT Filed: May 25, 2015

(86) PCT No.: PCT/CN2015/079688
§ 371 (c)(1),
(2) Date: Nov. 22, 2017

(87) PCT Pub. No.: WO2016/187772
PCT Pub. Date: Dec. 1, 2016

(65) Prior Publication Data
US 2018/0164613 A1    Jun. 14, 2018

(51) Int. Cl.
*G02F 1/05* (2006.01)
*G03B 17/02* (2006.01)
(Continued)

(52) U.S. Cl.
CPC ........... *G02F 1/0541* (2013.01); *G02B 5/201* (2013.01); *G02B 5/208* (2013.01); *G02B 5/23* (2013.01);
(Continued)

(58) Field of Classification Search
CPC .............. G02F 1/0541; H04N 5/23212; H04N 5/2254; G02B 5/208; G02B 5/201; G02B 13/001; G02B 5/23; G03B 17/02
(Continued)

(56) References Cited

U.S. PATENT DOCUMENTS

| | | |
|---|---|---|
| 4,992,347 A | 2/1991 | Hawkins et al. |
| 5,531,940 A | 7/1996 | Gupta et al. |

(Continued)

FOREIGN PATENT DOCUMENTS

| | | |
|---|---|---|
| CN | 1142797 A | 2/1997 |
| CN | 1639587 A | 7/2005 |

(Continued)

OTHER PUBLICATIONS

Yang, X. "Glasses material and quality inspection", Jul. 1, 2011, 10 pages.

*Primary Examiner* — Lin Ye
*Assistant Examiner* — Chan T Nguyen
(74) *Attorney, Agent, or Firm* — Slater Matsil, LLP

(57) ABSTRACT

Embodiments of the present invention disclose a photochromic lens module, a camera, and a terminal device. The photochromic lens module includes a lens module and a photochromic thin film. The lens module includes a first surface and a second surface. When the first surface is an incident surface, the second surface is a refractive surface; when the second surface is an incident surface, the first surface is a refractive surface. The photochromic thin film includes a first area and a second area. The photochromic thin film covers the first surface or the second surface. The first area uses a negative photochromic material, and the second area uses a positive photochromic material. By means of the embodiments of the present invention, a lens module can be effectively protected.

18 Claims, 3 Drawing Sheets

(51) Int. Cl.
  *G02B 13/00* (2006.01)
  *G02B 5/20* (2006.01)
  *G02B 5/23* (2006.01)
  *H04N 5/225* (2006.01)
  *H04N 5/232* (2006.01)

(52) U.S. Cl.
  CPC ........... *G02B 13/001* (2013.01); *G03B 17/02* (2013.01); *H04N 5/2254* (2013.01); *H04N 5/23212* (2013.01)

(58) Field of Classification Search
  USPC .......................................................... 348/335
  See application file for complete search history.

(56) References Cited

U.S. PATENT DOCUMENTS

| | | | |
|---|---|---|---|
| 7,884,992 | B1 | 2/2011 | Wang et al. |
| 2005/0063199 | A1 | 3/2005 | Levy et al. |
| 2005/0202267 | A1 | 9/2005 | Ha et al. |
| 2005/0258408 | A1 | 11/2005 | Molock et al. |
| 2007/0003776 | A1 | 1/2007 | Kang et al. |
| 2007/0133983 | A1 | 6/2007 | Traff |
| 2007/0217784 | A1 | 9/2007 | Kaneiwa et al. |
| 2008/0167183 | A1 | 7/2008 | Hoekstra et al. |
| 2008/0200983 | A1 | 8/2008 | Bernard et al. |
| 2009/0316246 | A1 | 12/2009 | Asai et al. |
| 2010/0157407 | A1 | 6/2010 | Kim et al. |
| 2010/0295003 | A1 | 11/2010 | Choi et al. |
| 2011/0038024 | A1* | 2/2011 | Wang .................. G02B 5/23 359/241 |
| 2011/0141336 | A1 | 6/2011 | Mittleman |
| 2012/0120473 | A1 | 5/2012 | Kumar et al. |
| 2012/0242954 | A1 | 9/2012 | Archambeau et al. |
| 2014/0098278 | A1* | 4/2014 | Koyama .................. G02B 7/04 348/335 |
| 2015/0276995 | A1 | 10/2015 | Nomura |

FOREIGN PATENT DOCUMENTS

| | | | | |
|---|---|---|---|---|
| CN | 2763854 | * | 3/2006 | ............. H04N 5/225 |
| CN | 2763854 | Y | 3/2006 | |
| CN | 1796321 | A | 7/2006 | |
| CN | 1842730 | A | 10/2006 | |
| CN | 1853070 | A | 10/2006 | |
| CN | 1954256 | A | 4/2007 | |
| CN | 101124263 | A | 2/2008 | |
| CN | 101128749 | A | 2/2008 | |
| CN | 101189536 | A | 5/2008 | |
| CN | 101475805 | A | 7/2009 | |
| CN | 101503215 | A | 8/2009 | |
| CN | 101512395 | A | 8/2009 | |
| CN | 101529245 | A | 9/2009 | |
| CN | 101639578 | A | 2/2010 | |
| CN | 101784591 | A | 7/2010 | |
| CN | 101842451 | A | 9/2010 | |
| CN | 203595887 | U | 5/2014 | |
| JP | H0540282 | A | 2/1993 | |
| JP | H05142700 | A | 6/1993 | |
| JP | H06317815 | A | 11/1994 | |
| JP | H07164552 | A | 6/1995 | |
| WO | 2014098093 | A1 | 6/2014 | |

* cited by examiner

Coat a first surface or a second surface of a lens module with a photochromic thin film to form a photochromic lens module, where the photochromic thin film includes a first area and a second area, the first area uses a negative photochromic material, and the second area uses a positive photochromic material — S401

FIG. 4

Coat a first surface or a second surface of a lens module with a photochromic thin film to form a photochromic lens module, where the photochromic thin film includes a first area and a second area, the first area uses a negative photochromic material, and the second area uses a positive photochromic material — S501

Cover the photochromic thin film with a mask, where the mask includes a transparent area and an opaque area, the transparent area covers the first area, and the opaque area covers the second area — S502

FIG. 5

PHOTOCHROMIC LENS MODULE, CAMERA AND TERMINAL DEVICE

CROSS-REFERENCE TO RELATED APPLICATIONS

This application is a national stage of International Application No. PCT/CN2015/079688, filed on May 25, 2015, which is hereby incorporated by reference in its entirety.

TECHNICAL FIELD

The present invention relates to the field of electronic technologies, and in particular, to a photochromic lens module, a camera, and a terminal device.

BACKGROUND

A camera is a video input device mainly including a lens module and an image sensor. Lens modules produced by different vendors are possibly not the same in terms of, for example, a quantity of lenses of a lens module that is produced, composition materials of lenses (such as a plastic nano-composite material and a transparent polymeric material), parameters of a lens module (such as a focal length and an aperture), and whether a special material (such as resin) is added between two lenses. A key factor ensuring quality of photos is to have a lens module with superior performance. If a vendor independently designs a lens module for improving quality of photos, the vendor needs to prevent a competitor from knowing how the lens module is produced and then performing mass production of the lens module. Therefore, to protect a lens module is particularly important.

SUMMARY

Embodiments of the present invention provide a photochromic lens module, a camera, and a terminal device, so as to effectively protect a lens module.

According to a first aspect of the embodiments of the present invention, a photochromic lens module is provided, where the photochromic lens module includes a lens module and a photochromic thin film. The lens module includes a first surface and a second surface. When the first surface is an incident surface, the second surface is a refractive surface; when the second surface is an incident surface, the first surface is a refractive surface. The photochromic thin film includes a first area and a second area; the photochromic thin film covers the first surface or the second surface; the first area uses a negative photochromic material, and the second area uses a positive photochromic material.

With reference to the first aspect, in a first possible implementation manner, the photochromic lens module further includes a mask, where the mask includes a transparent area and an opaque area; the mask covers the photochromic thin film; the transparent area covers the first area; and the opaque area covers the second area.

With reference to the first possible implementation manner of the first aspect, in a second possible implementation manner, the mask includes a transparent substrate and a light shielding layer, where the light shielding layer covers the transparent substrate; the opaque area includes the transparent substrate and the light shielding layer; and the transparent area includes the transparent substrate.

With reference to the second possible implementation manner of the first aspect, in a third possible implementation manner, the transparent substrate includes glass, quartz or resin.

With reference to any one of the first aspect or the first to the third possible implementation manners of the first aspect, in a fourth possible implementation manner, a thickness of the photochromic thin film is 10 nm to 1 μm.

With reference to any one of the first aspect or the first to the fourth possible implementation manners of the first aspect, in a fifth possible implementation manner, the first area includes at least one sub-area, and a diameter of the sub-area is 2 μm to 10 mm.

With reference to the fifth possible implementation manner of the first aspect, in a sixth possible implementation manner, a quantity of all the sub-areas of the first area is 1 to 1000.

With reference to the fifth possible implementation manner of the first aspect, in a seventh possible implementation manner, a shape of each sub-area of the first area includes a circle shape, a polygon shape, a sector shape or an arch shape.

According to a second aspect of the embodiments of the present invention, a camera is provided. The camera includes a photochromic lens module, an image sensor and a bracket, where the photochromic lens module is connected to the image sensor by means of the bracket. The photochromic lens module includes a lens module and a photochromic thin film. The lens module includes a first surface and a second surface. When the first surface is an incident surface, the second surface is a refractive surface. When the second surface is an incident surface, the first surface is a refractive surface. The photochromic thin film includes a first area and a second area. The photochromic thin film covers the first surface or the second surface. The first area uses a negative photochromic material, and the second area uses a positive photochromic material.

With reference to the second aspect, in a first possible implementation manner, the photochromic lens module further includes a mask, where the mask includes a transparent area and an opaque area; the mask covers the photochromic thin film; the transparent area covers the first area; and the opaque area covers the second area.

With reference to the first possible implementation manner of the second aspect, in a second possible implementation manner, the mask includes a transparent substrate and a light shielding layer, where the light shielding layer covers the transparent substrate; the opaque area includes the transparent substrate and the light shielding layer; and the transparent area includes the transparent substrate.

With reference to the second possible implementation manner of the second aspect, in a third possible implementation manner, the transparent substrate includes glass, quartz or resin.

With reference to any one of the second aspect or the first to the third possible implementation manners of the second aspect, in a fourth possible implementation manner, a thickness of the photochromic thin film is 10 nm to 1 μm.

With reference to any one of the second aspect or the first to the fourth possible implementation manners of the second aspect, in a fifth possible implementation manner, the first area includes at least one sub-area, and a diameter of the sub-area is 2 μm to 10 mm.

With reference to the fifth possible implementation manner of the second aspect, in a sixth possible implementation manner, a quantity of all the sub-areas of the first area is 1 to 1000.

With reference to the fifth possible implementation manner of the second aspect, in a seventh possible implementation manner, a shape of each sub-area of the first area includes a circle shape, a polygon shape, a sector shape or an arch shape.

With reference to any one of the second aspect or the first to the seventh possible implementation manners of the second aspect, in an eighth possible implementation manner, the camera further includes an infrared cut-off filter, where the infrared cut-off filter is located between the photochromic lens module and the image sensor.

With reference to the eighth possible implementation manner of the second aspect, in a ninth possible implementation manner, the camera further includes a focus motor, where the focus motor is located between the photochromic lens module and the infrared cut-off filter.

With reference to any one of the second aspect or the first to the ninth possible implementation manners of the second aspect, in a tenth possible implementation manner, the camera further includes a line connection substrate, where the line connection substrate is disposed at the bottom of the image sensor; and the image sensor is located between the photochromic lens module and the line connection substrate.

With reference to any one of the second aspect or the first to the ninth possible implementation manners of the second aspect, in an eleventh possible implementation manner, the camera further includes an optical protection window, where the optical protection window is disposed at the top of the photochromic lens module; and the photochromic lens module is located between the optical protection window and the image sensor.

According to a third aspect of the embodiments of the present invention, a terminal device is provided. The terminal device includes the camera according to the second aspect, a display screen and a processor, where the photochromic lens module is configured to capture an image; the image sensor is configured to convert the captured image into an electrical signal, and convert the electrical signal into a digital signal. The processor is configured to process the digital signal. The display screen displays the image under control of the processor.

Embodiments of the present invention provide a photochromic lens module. The photochromic lens module includes a lens module and a photochromic thin film. The lens module includes a first surface and a second surface. The photochromic thin film includes a first area and a second area. The photochromic thin film covers the first surface or the second surface. The first area uses a negative photochromic material, and the second area uses a positive photochromic material. When not under exposure to ultraviolet radiation, the first area is colorful, and the second area is transparent; when under exposure to ultraviolet radiation, the first area is transparent, and the second area is colorful. In this way, a competitor cannot know a structure of the lens module, and the lens module can be effectively protected.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 4 is a schematic flowchart of a method for manufacturing a photochromic lens module according to an embodiment of the present invention;

FIG. 5 is a schematic flowchart of a method for manufacturing a photochromic lens module according to another embodiment of the present invention;

DETAILED DESCRIPTION OF ILLUSTRATIVE EMBODIMENTS

Figure 1:
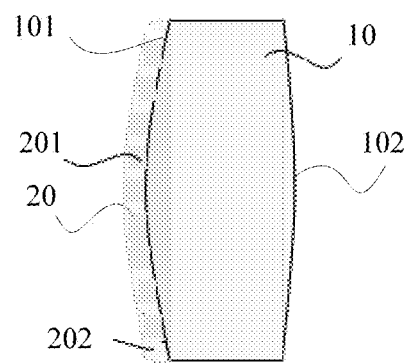
FIG. 1 is a schematic cross-sectional view of a photochromic lens module according to an embodiment of the present invention.

The following describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

An embodiment of the present invention discloses a photochromic lens module. The photochromic lens module includes a lens module and a photochromic thin film. The lens module includes a first surface and a second surface, and the photochromic thin film includes a first area and a second area. The photochromic thin film covers the first surface or the second surface. The first area uses a negative photochromic material, and the second area uses a positive photochromic material.

The lens module mentioned in this embodiment of the present invention may refer to an optical component including at least one lens. The lens module may include a first surface and a second surface. When the first surface is an incident surface, the second surface is a refractive surface; when the second surface is an incident surface, the first surface is a refractive surface.

The photochromic thin film mentioned in this embodiment of the present invention may have only one layer, and the photochromic thin film may include a first area and a second area. The first area uses a negative photochromic material, and the second area uses a positive photochromic material. The positive photochromic material has a feature of transforming from being transparent into being colorful under exposure to ultraviolet radiation, and the negative photochromic material has a feature of transforming from being colorful into being transparent under exposure to ultraviolet radiation. Specifically, when not under exposure to ultraviolet radiation, the positive photochromic material is transparent and the negative photochromic material displays a color such as red, green, blue or violet. When under exposure to ultraviolet radiation, the positive photochromic material displays a color such as red, green, blue or violet, and the negative photochromic material is transparent. That is, regardless of whether under exposure to ultraviolet radiation or not under exposure to ultraviolet radiation, the photochromic lens module is colorful, so that a competitor cannot know a structure of the lens module and the lens module can be effectively protected.

The positive photochromic material mentioned in this embodiment of the present invention may include at least one type, for example, a first positive photochromic material displaying red under exposure to ultraviolet radiation, or a second positive photochromic material displaying blue under exposure to ultraviolet radiation. Likewise, the negative photochromic material may include at least one type, for example, a first negative photochromic material displaying violet when not under exposure to ultraviolet radiation, or a second negative photochromic material displaying green when not under exposure to ultraviolet radiation. This is not specifically limited in this embodiment of the present invention.

The foregoing photochromic lens module may be applied to a device such as a camera, glasses, a sight glass or a light fixture. The camera may be further applied to a terminal such as a personal computer, a smartphone (such as an Android phone or an iOS phone), a tablet computer, a palmtop computer or a video camera. This is not specifically limited in this embodiment of the present invention.

Referring to FIG. 1, FIG. 1 is a schematic cross-sectional view of a photochromic lens module according to a first embodiment of the present invention. As shown in FIG. 1, the photochromic lens module according to this embodiment of the present invention includes a lens module 10 and a photochromic thin film 20.

The lens module 10 includes a first surface 101 and a second surface 102. When the first surface 101 is an incident surface, the second surface 102 is a refractive surface; when the second surface 102 is an incident surface, the first surface 101 is a refractive surface.

The photochromic thin film 20 includes a first area 201 and a second area 202. The photochromic thin film 20 covers the first surface 101 or the second surface 102. The first area 201 uses a negative photochromic material, and the second area 202 uses a positive photochromic material.

In an optional embodiment, the positive photochromic material may include one type, and the negative photochromic material may include one type. Using a schematic interface diagram of a photochromic thin film shown in FIG. 2 as an example, the photochromic thin film 20 includes a first area 201 and a second area 202. The first area 201 may use a negative photochromic material, and the second area 202 may use a positive photochromic material. It can be seen from FIG. 2 that the first area 201 may be an area including multiple rectangles, and the second area 202 is an area excluding the rectangles. When not under exposure to ultraviolet radiation, the second area 202 is transparent, and the first area 201 displays a preset color (for example, red, blue or green). When under exposure to ultraviolet radiation, the second area 202 displays a preset color (for example, red, blue or green), and the first area 201 is transparent. That is, when not under exposure to ultraviolet radiation, the first area 201 is colorful; when under exposure to ultraviolet radiation, the second area 202 is colorful. In this way, regardless of whether under exposure to ultraviolet radiation or not under exposure to ultraviolet radiation, the photochromic thin film 20 is colorful, so that a competitor cannot implement a function such as photographing directly by using the photochromic lens module. In this way, optical encoding for the lens module can be implemented.

In another optional embodiment, the positive photochromic material may include one type, and the negative photochromic material may include two types. Using a schematic interface diagram of a photochromic thin film shown in FIG. 3 as an example, the photochromic thin film 20 includes a first area 201 and a second area 202. The first area 201 may include a first unit area and a second unit area. An area to which a light gray circular pattern belongs is the first unit area, and an area to which a dark gray circular pattern belongs is the second unit area. The first unit area may use a first negative photochromic material, and the second unit area may use a second negative photochromic material. When not under exposure to ultraviolet radiation, the second area 202 is transparent; the first unit area displays a first preset color (for example, red, blue or green); and the second unit area displays a second preset color (for example, violet, yellow or orange). When under exposure to ultraviolet radiation, the second area 202 displays a preset color (for example, red, blue or green), and the first area 201 is transparent. That is, when not under exposure to ultraviolet radiation, the first area 201 is colorful; when under exposure to ultraviolet radiation, the second area 202 is colorful. In this way, regardless of whether under exposure to ultraviolet radiation or not under exposure to ultraviolet radiation, the photochromic thin film 20 is colorful, so that after obtaining the photochromic lens module, a competitor cannot implement a function such as photographing directly by using the photochromic lens module. In this way, optical encoding for the lens module can be implemented.

It should be noted that in this embodiment of the present invention, the positive photochromic material and the negative photochromic material include but are not limited to the foregoing types. Optionally, the positive photochromic material may include two types, and the negative photochromic material may include two types. The first unit area of the first area 201 uses the first negative photochromic material, and the second unit area of the first area 201 uses the second negative photochromic material; a first unit area of the second area 202 uses a first positive photochromic material, and a second unit area of the second area 202 uses a second positive photochromic material. This is not specifically limited in this embodiment of the present invention.

In an optional embodiment, the photochromic lens module may further include a mask.

The mask may include a transparent area and an opaque area. The mask covers the photochromic thin film. Specifically, the transparent area of the mask covers the first area 201, and the opaque area of the mask covers the second area 202.

In a specific implementation, when under exposure to ultraviolet radiation, ultraviolet can pass through the transparent area to radiate on the first area 201, and the first area 201 using the negative photochromic material is transparent; and ultraviolet cannot pass through the opaque area to radiate on the second area 202, and the second area 202 is still transparent. That is, ultraviolet radiates on the photochromic lens module that includes the mask, both the first area 201 and the second area 202 are transparent, and a consumer may implement a function such as photographing by using the photochromic lens module that includes the mask. In this way, optical decoding for the lens module is implemented. In addition, a vendor producing the photochromic thin film and a vendor producing the mask may not be the same vendor, and even if a competitor obtains the photochromic lens module that includes the photochromic thin film and the mask, the competitor cannot know a structure of the lens module. In this way, the lens module can be protected.

Figure 2:
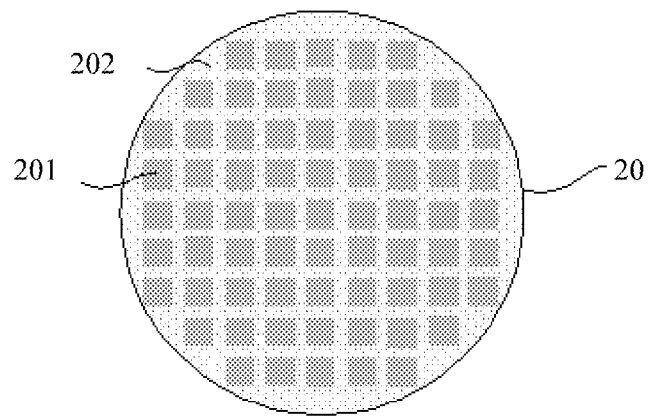
FIG. 2 is a schematic interface diagram of a photochromic thin film according to an embodiment of the present invention.

Using a schematic interface diagram of a photochromic thin film shown in FIG. 2 as an example, the photochromic thin film 20 includes a first area 201 and a second area 202. A transparent area of a mask covers the first area 201, and an opaque area of the mask covers the second area 202.

Figure 3:
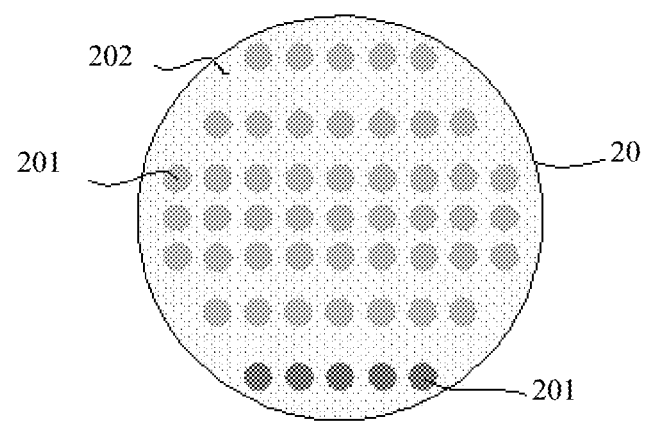
FIG. 3 is a schematic interface diagram of a photochromic thin film according to another embodiment of the present invention.

Using a schematic interface diagram of a photochromic thin film shown in FIG. 3 as an example, the photochromic thin film 20 includes a first area 201 and a second area 202. A transparent area of a mask covers the first area 201, and an opaque area of the mask covers the second area 202. The photochromic thin film shown in FIG. 2 is different from the photochromic thin film shown in FIG. 3, and the masks covering the corresponding photochromic thin films are also different.

In an optional embodiment, the mask may include a transparent substrate and a light shielding layer.

The light shielding layer covers the transparent substrate. The opaque area includes the transparent substrate and the light shielding layer, and the transparent area includes the transparent substrate.

Further, optionally, the transparent substrate may include glass, quartz or resin. Ultraviolet can pass through the transparent substrate to radiate on the first area 201.

Further, optionally, the light shielding layer may include metal or silica gel, so that ultraviolet cannot pass through the light shielding layer and the transparent substrate to radiate on the second area 202.

In an optional embodiment, a thickness of the photochromic thin film 20 may be to nm to 1 μm. When the thickness of the photochromic thin film 20 is less than 10 nm, manufacturing process complexity of the photochromic thin film is increased. When the thickness of the photochromic thin film 20 is greater than 1 μm, a height of the photochromic lens module is increased, and therefore, a height of the camera is increased, resulting in insufficient convenience.

In an optional embodiment, the first area 201 may include at least one sub-area, and a diameter of the sub-area is 2 μm to 10 mm. When the diameter of the sub-area is less than or equal to 2 μm, manufacturing process difficulty is increased. As a result, a spray gun, a disc atomizer, a dispenser or a nanoimprint lithography device cannot process the sub-area accurately, and it is easy to form flares. A diameter of the first surface lot or the second surface 102 of the lens module 10 is usually less than or equal to 110 mm. The diameter of the sub-area needs to be less than the diameter of the first surface 101 or the second surface 102, that is, the diameter of the sub-area is less than 10 mm. Using a schematic interface diagram of a photochromic thin film shown in FIG. 2 as an example, each sub-area of the first area 201 is an area to which a square belongs, and the second area 202 is another area among areas to which squares of the photochromic thin film 20 belong. Using a schematic interface diagram of a photochromic thin film shown in FIG. 3 as an example, each sub-area of the first area 201 is an area to which a circle belongs, and the second area 202 is another area among areas to which circles of the photochromic thin film 20 belong.

Further, optionally, a quantity of all the sub-areas of the first area 201 may be 1 to 1000. When the quantity of all the sub-areas of the first area 201 is zero, the photochromic thin film 20 uses a positive photochromic material, so that the photochromic lens module is transparent when not under exposure to ultraviolet radiation. As a result, the lens module cannot be protected effectively. When the quantity of all the sub-areas of the first area 201 is greater than 1000, costs are relatively high.

Further, optionally, all the sub-areas of the first area 201 are arranged in an array manner, and the sub-areas arranged in the array manner may constitute a shape such as a square shape, a rhombus shape or a hexagon shape. Using a schematic interface diagram of a photochromic thin film shown in FIG. 2 as an example, all the sub-areas of the first area 201 may be arranged periodically, that is, distances between neighboring sub-areas are the same, and all the sub-areas of the first area 201 may constitute an octagon shape. Using a schematic interface diagram of a photochromic thin film shown in FIG. 3 as an example, all the sub-areas of the first area 201 may not be arranged periodically, that is, distances between neighboring sub-areas are not the same, and all the sub-areas of the first area 201 may constitute an octagon shape.

Further, optionally, a shape of each sub-area of the first area 201 includes a circle shape, a polygon shape, a sector shape or an arch shape, and is not specifically limited in this embodiment of the present invention.

The photochromic lens module shown in FIG. 1 includes a lens module 10 and a photochromic thin film 20. The lens module 10 includes a first surface 101 and a second surface 102. The photochromic thin film 20 includes a first area 201 and a second area 202. The photochromic thin film 20 covers the first surface lot or the second surface 102. The first area 201 uses a negative photochromic material, and the second area 202 uses a positive photochromic material, thereby effectively protecting the lens module.

Referring to FIG. 4, FIG. 4 is a schematic flowchart of a method for manufacturing a photochromic lens module according to an embodiment of the present invention. As shown in FIG. 4, the method for manufacturing a photochromic lens module according to this embodiment of the present invention may include:

S401: Coat a first surface or a second surface of a lens module with a photochromic thin film to form a photochromic lens module, where the photochromic thin film includes a first area and a second area, the first area uses a negative photochromic material, and the second area uses a positive photochromic material.

For a terminal, the first surface or the second surface of the lens module may be coated with the photochromic thin film to form the photochromic lens module. When the first surface is an incident surface, the second surface is a refractive surface; when the second surface is an incident surface, the first surface is a refractive surface. The photochromic thin film includes a first area and a second area. The first area uses a negative photochromic material, and the second area uses a positive photochromic material.

In an optional embodiment, for the terminal, the first surface or the second surface of the lens module may be coated with the photochromic thin film in such a manner as spraying, dispensing or nanoimprint lithography. Spraying refers to: a method for dispersing a photochromic material into even and tiny droplets with the help of a pressure or a centrifugal force and by means of a spray gun or a disc atomizer, and spraying the droplets onto the first area. Dispensing may include air pressure dispensing, steel needle dispensing or screw dispensing. Air pressure dispensing refers to: Compress air, feed the compressed air into a dispensing bottle to press a photochromic material into a feed tube connected to a piston chamber. When a piston is in an upstroke, the piston chamber is filled with the photochromic material; when the piston pushes a dispensing needle head downward, the photochromic material is pressed out from a needle mouth. Nanoimprint lithography refers to: Duplicate a nanopattern onto a lens by means of a medium (such as a polymeric membrane) and by using a template having the nanopattern.

Using a schematic interface diagram of a photochromic thin film shown in FIG. 2 as an example, for a terminal, a negative photochromic material may be dispersed into even and tiny droplets with the help of a pressure or a centrifugal force and by means of a spray gun or a disc atomizer, and the droplets are sprayed onto the first area 201. A spraying thickness may be 10 nm to 1 μm. For the terminal, the first area 201 may be cured in such a manner as low temperature curing or UV curing to form sub-areas after the curing. A diameter of the sub-area is 2 μm to 10 mm. A quantity of all the sub-areas of the first area 201 is 1 to 1000. All the sub-areas of the first area 201 are arranged in an array manner, and a shape of each sub-area of the first area 20 includes a circle shape, a polygon shape, a sector shape or an arch shape. Further, for the terminal, a positive photochromic material may be sprayed onto a second area 202 in such a manner as air pressure dispensing or nanoimprint lithography. A spraying thickness may be 10 nm to 1 μm. For the terminal, the second area 202 may be cured in such a manner as low temperature curing or UV curing. The cured first area 201 and the cured second area 202 form a photochromic thin film 20. A curing manner may include low temperature curing, UV curing (Ultraviolet curing) or the like. Low temperature curing requires a temperature below 1° C.

Using a schematic interface diagram of a photochromic thin film shown in FIG. 3 as an example, for a terminal, a first negative photochromic material may be spayed onto a first unit area of a first area 201 by means of a spray gun or a disc atomizer. For the terminal, the first unit area may be cured in such a manner as low temperature curing or UV curing. Further, for the terminal, a second negative photochromic material may be sprayed onto a second unit area of the first area 201 by means of a dispenser. For the terminal, the second unit area may be cured in such a manner as low temperature curing or UV curing. Further, for the terminal, a positive photochromic material may be sprayed onto a second area 202 by means of nanoimprint lithography. For the terminal, the second area 202 may be cured in such a manner as low temperature curing or UV curing. The cured first area 201 and the cured second area 202 form a photochromic thin film 20.

In this embodiment of the present invention, when not under exposure to ultraviolet radiation, the first area displays a preset color (for example, red, blue or green), and the second area is transparent. When under exposure to ultraviolet radiation, the first area is transparent, and the second area displays a preset color (for example, red, blue or green). That is, when not under exposure to ultraviolet radiation, the first area is colorful. When under exposure to ultraviolet radiation, the second area is colorful. In this way, regardless of whether under exposure to ultraviolet radiation or not under exposure to ultraviolet radiation, the photochromic thin film is colorful, so that after obtaining the photochromic lens module, a competitor cannot implement a function such as photographing directly by using the photochromic lens module. In this way, optical encoding for the lens module is implemented. Further, the competitor cannot know a structure of the lens module, and therefore, the lens module can be effectively protected.

In the method for manufacturing a photochromic lens module shown in FIG. 4, a first surface or a second surface of a lens module is coated with a photochromic thin film to form a photochromic lens module. The photochromic thin film includes a first area and a second area. The first area uses a negative photochromic material, and the second area uses a positive photochromic material, thereby effectively protecting the lens module.

Referring to FIG. 5, FIG. 5 is a schematic flowchart of a method for manufacturing a photochromic lens module according to another embodiment of the present invention.

As shown in FIG. 5, the method for manufacturing a photochromic lens module according to this embodiment of the present invention may include:

S501: Coat a first surface or a second surface of a lens module with a photochromic thin film to form a photochromic lens module, where the photochromic thin film includes a first area and a second area, the first area uses a negative photochromic material, and the second area uses a positive photochromic material.

For a terminal, the first surface or the second surface of the lens module may be coated with the photochromic thin film to form the photochromic lens module. The photochromic thin film includes a first area and a second area. The first area uses a negative photochromic material, and the second area uses a positive photochromic material. The positive photochromic material has a feature of transforming from being transparent into being colorful under exposure to ultraviolet radiation, and the negative photochromic material has a feature of transforming from being colorful into being transparent under exposure to ultraviolet radiation. That is, regardless of whether under exposure to ultraviolet radiation or not under exposure to ultraviolet radiation, the photochromic lens module is colorful. In this way, a competitor cannot implement a function of photographing directly by using the photochromic lens module. In this way, optical encoding for the lens module can be implemented.

S502: Cover the photochromic thin film with a mask, where the mask includes a transparent area and an opaque area, the transparent area covers the first area, and the opaque area covers the second area.

After the first surface or the second surface of the lens module is coated with the photochromic thin film for the terminal to form the photochromic lens module, the photochromic thin film may be covered with the mask. The mask may include a transparent area and an opaque area. For the terminal, the first area may be covered with the transparent area, and the second area may be covered with the opaque area.

Using a schematic interface diagram of a photochromic thin film shown in FIG. 2 as an example, the photochromic thin film 20 includes a first area 201 and a second area 202. For a terminal, the first area 201 may be covered with a transparent area of a mask, and the second area 202 may be covered with an opaque area of the mask. Using a schematic interface diagram of a photochromic thin film shown in FIG. 3 as an example, the photochromic thin film 20 includes a first area 201 and a second area 202. For a terminal, the first area 201 may be covered with a transparent area of a mask, and the second area 202 may be covered with an opaque area of the mask. The photochromic thin film shown in FIG. 2 is different from the photochromic thin film shown in FIG. 3, and the masks covering the corresponding photochromic thin films are also different.

In an optional embodiment, the mask may include a transparent substrate and a light shielding layer.

For a terminal, the transparent substrate may be covered with the light shielding layer. The opaque area includes the transparent substrate and the light shielding layer, and the transparent area includes the transparent substrate.

In a specific implementation, for the terminal, the photochromic thin film may be coated with the transparent substrate, so as to make the transparent substrate cover the entire photochromic thin film. Further, for the terminal, the transparent substrate is covered with the light shielding layer in such a manner as vapor deposition or printing, so as to make the light shielding layer cover the second area. The opaque area includes the transparent substrate and the light shielding layer, and the transparent area includes the transparent substrate.

Further, optionally, the transparent substrate may include glass, quartz or resin. Ultraviolet can pass through the transparent substrate to radiate on the first area.

Further, optionally, the light shielding layer may include metal or silica gel, so that ultraviolet cannot pass through the light shielding layer and the transparent substrate to radiate on the second area.

When under exposure to ultraviolet radiation, ultraviolet can pass through the transparent area to radiate on the first area, and therefore the first area using a negative photochromic material is transparent; and ultraviolet cannot pass through the opaque area to radiate on the second area, and therefore the second area is still transparent. That is, both the first area and the second area are transparent, and therefore a consumer may implement a function such as photographing by using the photochromic lens module including the mask. In this way, optical decoding for the lens module is implemented.

In the method for manufacturing a photochromic lens module shown in FIG. 5, a first surface or a second surface of a lens module is coated with a photochromic thin film to form a photochromic lens module. The photochromic thin film includes a first area and a second area. The first area uses a negative photochromic material, and the second area uses a positive photochromic material. The photochromic thin film is covered with a mask. The mask includes a transparent area and an opaque area. The transparent area covers the first area, and the opaque area covers the second area, so as to implement transparentization processing for the photochromic lens module, and help a consumer implement a function such as photographing by using the photochromic lens module that is subject to the transparentization processing. Further, because a competitor cannot know a structure of the lens module, the lens module can be effectively protected.

Figure 6:
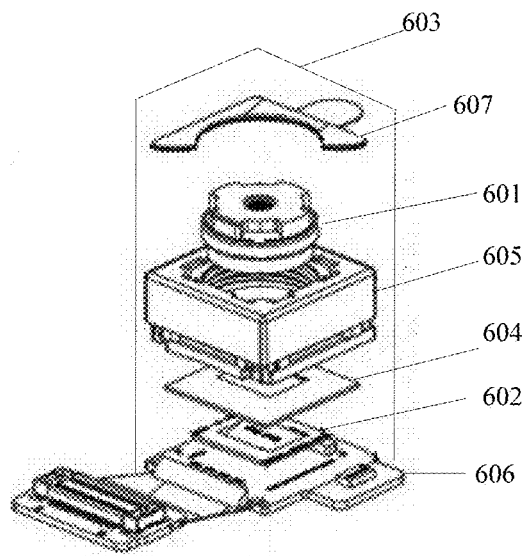
FIG. 6 is a schematic structural diagram of a camera according to an embodiment of the present invention.

Referring to FIG. 6, FIG. 6 is a schematic structural diagram of a camera according to an embodiment of the present invention. The camera may include at least a photochromic lens module 601, an image sensor 602 and a bracket 603.

The photochromic lens module 601 is connected to the image sensor 602 by means of the bracket 603. For example, in a specific implementation, the bracket 603 may be set in a through manner, so as to form accommodation space. The photochromic lens module 601 and the image sensor 602 are located in the accommodation space. The photochromic lens module 601 includes a lens module, and a photochromic thin film covering a first surface or a second surface of the lens module. The photochromic lens module 601 is configured to capture an image. The image sensor 602 is configured to convert the image captured by the photochromic lens module 601 from an optical signal into an electrical signal, and convert the electrical signal into a digital signal.

For descriptions on the photochromic lens module 601 of the camera, refer to FIG. 1 to FIG. 3, and descriptions on FIG. 1 to FIG. 3, and details are not described herein again.

In an optional embodiment, the photochromic lens module 601 may further include a mask. The mask includes a transparent area and an opaque area. The mask covers the photochromic thin film; the transparent area of the mask covers the first area; and the opaque area of the mask covers the second area.

Further, optionally, the mask may include a transparent substrate and a light shielding layer. The light shielding layer covers the transparent substrate. The opaque area includes the transparent substrate and the light shielding layer, and the transparent area includes the transparent substrate.

Further, optionally, the transparent substrate includes glass, quartz or resin.

In an optional embodiment, a thickness of the photochromic thin film is 10 nm to 1 µm.

In an optional embodiment, the first area includes at least one sub-area, and a diameter of the sub-area is 2 µm to 10 mm.

Further, optionally, a quantity of the sub-areas of the first area is 1 to 1000.

Further, optionally, a shape of each sub-area of the first area includes a circle shape, a polygon shape, a sector shape or an arch shape.

In an optional embodiment, the camera may further include an infrared cut-off filter 604, where the infrared cut-off filter 604 is located between the photochromic lens module 601 and the image sensor 602.

In a specific implementation, the infrared cut-off filter 604 is fastened in the accommodation space formed by the bracket 603. The photochromic lens module 601, the image sensor 602 and the bracket 603 are combined to form enclosed space. The infrared cut-off filter 604 is located in the enclosed space, and is configured to remove infrared rays projecting onto the image sensor 603, so as to prevent the image sensor 603 from producing a false color or corrugation, thereby improving resolution and color reproduction performance.

Further, optionally, the camera may further include a focus motor 605, where the focus motor 605 is located between the photochromic lens module 601 and the infrared cut-off filter 604.

For example, in a specific implementation, the photochromic lens module 601 may be installed on the focus motor 605, and the focus motor 605 is installed on the bracket 603. The photochromic lens module 601 and the infrared cut-off filter 604 are disposed opposite to each other after a component formed by the photochromic lens module 601 and the focus motor 605 is installed on the bracket 603. The focus motor 605 may be configured to implement auto-focus.

In an optional embodiment, the camera may further include a line connection substrate 606, where the line connection substrate 606 is disposed at the bottom of the image sensor 602, and the image sensor 602 is located between the photochromic lens module 601 and the line connection substrate 606.

In a specific implementation, the line connection substrate 606 is configured to bear an element such as the bracket 603. The image sensor 602 may be disposed on the line connection substrate 606.

In an optional embodiment, the camera may further include an optical protection window 607, where the optical protection window 607 is disposed at the top of the photochromic lens module 601, and the photochromic lens module 601 is located between the optical protection window 607 and the image sensor 602.

In a specific implementation, the optical protection window 607 may be installed on the bracket 603. The optical protection window 607 and the image sensor 602 are disposed opposite to each other after a component formed by the photochromic lens module 601 and the optical protection window 607 is installed on the bracket 603. The optical protection window 607 is configured to prevent dust from entering the photochromic lens module 601, thereby protecting the photochromic lens module 601.

The camera shown in FIG. 6 includes the photochromic lens module 601, the image sensor 602 and the bracket 603. The photochromic lens module 601 includes a lens module and a photochromic thin film. Because a competitor cannot know a structure of the lens module, the lens module can be effectively protected.

Figure 7:
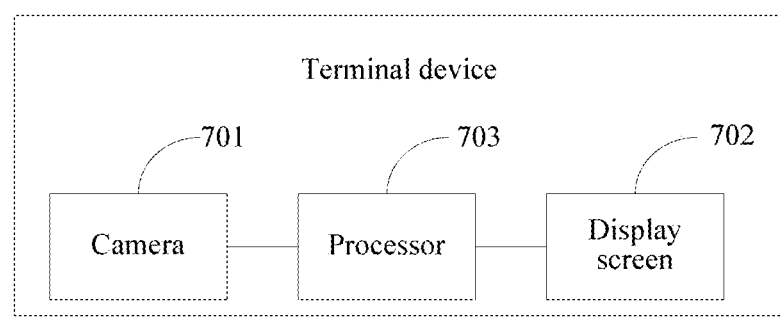
FIG. 7 is a schematic structural diagram of a terminal device according to an embodiment of the present invention.

Referring to FIG. 7, FIG. 7 is a schematic structural diagram of a terminal device according to an embodiment of the present invention. The terminal device in this embodiment of the present invention may include at least a camera 701, a display screen 702 and a processor 703. The camera 701 includes a photochromic lens module, a bracket and an image sensor. The photochromic lens module is connected to the image sensor by means of the bracket. The photochromic lens module can capture an image; the image sensor can convert the captured image into an electrical signal, and convert the electrical signal into a digital signal; the processor 703 processes the digital signal; and the image may be displayed by the display screen 702 under control of the processor 703. The image may be a compressed image.

The processor 703 may be an image signal processor or a central processing unit CPU.

For descriptions on the camera 701 of the terminal device, refer to FIG. 6 and descriptions on FIG. 6. For the photochromic lens module, refer to FIG. 1 to FIG. 3 and descriptions on FIG. 1 to FIG. 3, and details are not described herein again.

The terminal device may be a mobile phone, a tablet computer, a computer, a digital camera or the like.

It should be noted that, in the foregoing embodiments, the description of each embodiment has respective focuses. For a part that is not described in detail in an embodiment, reference may be made to related descriptions in other embodiments. In addition, a person skilled in the art should also understand that the embodiments described in this specification all belong to preferred embodiments, and the actions and units are not necessarily mandatory to the present invention.

What are disclosed above are merely examples of embodiments of the present invention, and certainly is not intended to limit the protection scope of the present invention. Therefore, equivalent variations made in accordance with the claims of the present invention shall fall within the scope of the present invention.

What is claimed is:

1. A photochromic lens module, comprising:
a lens module; and
a photochromic thin film;
wherein the lens module comprises a first surface and a second surface, the first surface is an incident surface, and the second surface is a refractive surface; and
wherein the photochromic thin film comprises a first area and a second area, the photochromic thin film covers the first surface, the first area uses a negative photochromic material, and the second area uses a positive photochromic material, wherein the negative photochromic material is configured to display a color when not exposed to a radiation and to be transparent when exposed to the radiation, and the positive photochromic material is configured to be transparent when not exposed to the radiation and to display a color when exposed to the radiation.

2. The photochromic lens module according to claim 1, further comprising:
a mask, wherein the mask comprises a transparent area and an opaque area, the mask covers the photochromic thin film, the transparent area covers the first area, and the opaque area covers the second area.

3. The photochromic lens module according to claim 2, wherein the mask further comprises:
a transparent substrate; and
a light shielding layer;
wherein the light shielding layer covers the transparent substrate, the opaque area comprises the transparent substrate and the light shielding layer, and the transparent area comprises the transparent substrate.

4. The photochromic lens module according to claim 1, wherein a thickness of the photochromic thin film is 10 nm to 1 μm.

5. The photochromic lens module according to claim 1, wherein the first area comprises at least one sub-area, and a diameter of the sub-area is 2 μm to 10 mm.

6. A camera, comprising:
a photochromic lens module;
an image sensor; and
a bracket;
wherein the photochromic lens module is connected to the image sensor by the bracket;
wherein the photochromic lens module comprises a lens module and a photochromic thin film, wherein the lens module comprises a first surface and a second surface; and
wherein the photochromic thin film comprises a first area and a second area, the photochromic thin film covers the first surface, the first area uses a negative photochromic material, and the second area uses a positive photochromic material, and wherein the first area comprises a plurality of sub-areas that are respectively disposed in and surrounded by the second area.

7. The camera according to claim 6, wherein the photochromic lens module further comprises:
a mask, wherein the mask comprises a transparent area and an opaque area, the mask covers the photochromic thin film, the transparent area covers the first area, and the opaque area covers the second area.

8. The camera according to claim 7, wherein the mask further comprises a transparent substrate and a light shielding layer; and
wherein the light shielding layer covers the transparent substrate, the opaque area comprises the transparent substrate and the light shielding layer, and the transparent area comprises the transparent substrate.

9. The camera according to claim 6, further comprising an infrared cut-off filter, wherein the infrared cut-off filter is located between the photochromic lens module and the image sensor.

10. The camera according to claim 9, further comprising a focus motor, wherein the focus motor is located between the photochromic lens module and the infrared cut-off filter.

11. A terminal, comprising:
a display screen;
a processor; and
a camera, wherein the camera comprises a photochromic lens module and an image sensor, the photochromic lens module is configured to capture an image, and the image sensor is configured to convert the captured image into an electrical signal, and convert the electrical signal into a digital signal;
wherein the processor is configured to process the digital signal;
wherein the display screen displays the image under control of the processor;

wherein the photochromic lens module comprises a lens module and a photochromic thin film, and the lens module comprises a first surface and a second surface; and wherein the photochromic thin film comprises a first area and a second area, the photochromic thin film covers the first surface, the first area uses a negative photochromic material, and the second area uses a positive photochromic material, and wherein the first area and the second area are positioned side by side along the first surface.

12. The terminal according to claim 11, wherein the photochromic lens module further comprises a mask, the mask comprises a transparent area and an opaque area, the mask covers the photochromic thin film, the transparent area covers the first area, and the opaque area covers the second area.

13. The terminal according to claim 12, wherein the mask further comprises a transparent substrate and a light shielding layer, the light shielding layer covers the transparent substrate, the opaque area comprises the transparent substrate and the light shielding layer, and the transparent area comprises the transparent substrate.

14. The terminal according to claim 11, wherein the camera further comprises an infrared cut-off filter, and the infrared cut-off filter is located between the photochromic lens module and the image sensor.

15. The terminal according to claim 14, wherein the camera further comprises a focus motor, and the focus motor is located between the photochromic lens module and the infrared cut-off filter.

16. The terminal according to claim 11, wherein the camera further comprises a line connection substrate, the line connection substrate is disposed at the bottom of the image sensor, and the image sensor is located between the photochromic lens module and the line connection substrate.

17. The terminal according to claim 11, wherein the camera further comprises an optical protection window, the optical protection window is disposed at the top of the photochromic lens module, and the photochromic lens module is located between the optical protection window and the image sensor.

18. The terminal according to claim 11, wherein the terminal is a mobile phone, a tablet computer, a computer or a digital camera.

\* \* \* \* \*